United States Patent [19]
Kim et al.

[11] Patent Number: 5,469,228
[45] Date of Patent: Nov. 21, 1995

[54] MEMORY ADDRESS AND DISPLAY CONTROL APPARATUS FOR HIGH DEFINITION TELEVISION

[75] Inventors: Beom S. Kim, Seoul; Jin H. Lee, Kyungki-do; Kyoung B. Koo, Seoul, all of Rep. of Korea

[73] Assignee: Hyundai Electronics Industries Co., Ltd., Rep. of Korea

[21] Appl. No.: 174,241

[22] Filed: Dec. 28, 1993

[30] Foreign Application Priority Data

Dec. 31, 1992 [KR] Rep. of Korea ............... 92-27240
Dec. 31, 1992 [KR] Rep. of Korea ............... 92-27243

[51] Int. Cl.$^6$ ............... H04N 7/12; H04N 11/02
[52] U.S. Cl. ............... 348/715; 348/716; 348/407; 348/431
[58] Field of Search ............... 348/430, 431, 348/403, 404, 407, 567, 467, 451, 452, 714–719; 345/189, 190, 200, 201; H04N 11/02, 7/18, 7/12, 7/00, 5/222

[56] References Cited

U.S. PATENT DOCUMENTS

| | | | |
|---|---|---|---|
| 4,403,250 | 9/1983 | Kellar | 348/452 |
| 4,899,220 | 2/1990 | Basile et al. | |
| 4,982,288 | 1/1991 | Isobe et al. | 348/452 |
| 5,093,720 | 3/1992 | Krause et al. | 348/452 |
| 5,103,295 | 4/1992 | Uwabata et al. | 348/451 |

*Primary Examiner*—James J. Groody
*Assistant Examiner*—Michael H. Lee
*Attorney, Agent, or Firm*—Browning, Bushman, Anderson & Brookhart

[57] ABSTRACT

A memory address and display control apparatus for an high definition television comprising a memory address controller for controlling memory read/write addresses in response to a motion vector and a control signal, the memory address controller having a display read control circuit, a motion compensation read control circuit, and a raster format write control circuit, a memory unit having a previous frame memory for storing a video signal of a previous frame and a present frame memory for storing a video signal of a present frame, a multiplexing circuit for 2 to 1-multiplexing the output addresses from the memory address controller to alternately address the previous frame memory and the present frame memory in the memory unit, an input/output controller for controlling data input/output of the memory unit in response to frame and invert frame signals, a display controller for receiving video data from the memory unit under the control of the input/output controller and displaying the received video data, and a motion compensation circuit for receiving previous frame video data from the memory unit under the control of the input/output controller and adding a DCT coefficient to the received previous frame video data to transform the received previous frame video data into present frame video data.

5 Claims, 8 Drawing Sheets

| | 1048<br>(26.24μsec) | 296<br>(5.54μsec) |
|---|---|---|
| 480 | EVEN FIELD (Y VIDEO DATA) | H BLANK |
| 45 | V BLANK (1.43msec) | |
| 480 | ODD FIELD (Y VIDEO DATA) | H BLANK |
| 45 | V BLANK (1.43msec) | |

| | 352<br>(26.24μsec) | 296<br>(5.54μsec) |
|---|---|---|
| 480 | EVEN FIELD (U, V VIDEO DATA) | H BLANK |
| 45 | V BLANK (1.43msec) | |
| 480 | ODD FIELD (U, V VIDEO DATA) | H BLANK |
| 45 | V BLANK (1.43msec) | |

MEMORY ADDRESS AND DISPLAY CONTROL APPARATUS FOR HIGH DEFINITION TELEVISION

BACKGROUND OF THE INVENTION

1. Field of the Invention

The present invention relates in general to the control of a motion compensation circuit for video processing systems employing a digital video compression manner such as a high definition television (referred to hereinafter as "HDTV"), a video phone, a moving picture expert group (referred to hereinafter as MPEG), a karaoke, a multimedia, etc., and more particularly to a memory address and display control apparatus for an HDTV in which an address is generated from a memory address controller for motion compensation of the HDTV and then efficiently interfaced with a frame memory unit; data input/output of the frame memory unit are controlled by an input/output controller; a display read control circuit is provided in the memory address controller to read video data stored in the unit of block in the frame memory unit in a raster scanning manner and to display the read video data on a screen; and luminance and color difference signals are separated from the video data from the frame memory unit by a display controller.

DESCRIPTION OF THE PRIOR ART

Generally, in an advance television (referred to hereinafter as "ATV"), or an HDTV, the number of scanning lines is at least twice that of an existing television, and an aspect ratio is greater than that of the existing television, resulting in provision of a large-scale picture of high quality.

The HDTV has the following fundamental elements: scanning lines, numbering 1125; active scanning lines, numbering 1035; a field frequency of 60 Hz; a 2:1 interlaced scanning manner; an aspect ratio of 16:9; and pixels, numbering 1920 per scanning line (luminance signal) and 960 per scanning line (color difference signal), which are specified by Comité Consultatif International des Radiocommunications (CCIR).

One example of this form of HDTV is shown in U.S. Pat. No. 4,899,220, assigned to North American Philips Corporation, New York, N.Y. In this patent, a wide aspect ratio television signal is generated at the transmitting end, and this signal is decomposed into a main panel component adapted to be received on a standard NTSC receiver and one or more augmentation panel components. For reception as a high definition television signal with a wide aspect ratio, the two or more panels must be recombined at the receiver. This HDTV system was made to be compatible with an NTSC television system. Although the above-mentioned conventional HDTV system is compatible with the NTSC television system, it has the disadvantage that it does not propose how to control frame memory address and display.

SUMMARY OF THE INVENTION

The present invention has been conceived in view of the above problem, and it is an object of the present invention to provide a memory address and display control apparatus for an HDTV in which addresses are generated from a memory address controller for motion compensation of the HDTV and then efficiently interfaced with a frame memory unit; data input/output of the frame memory unit are controlled by an input/output controller; a display read control circuit is provided in the memory address controller to read video data stored in the unit of block in the frame memory unit in a raster scanning manner and to display the read video data on a screen; and luminance and color difference signals are separated from the video data from the frame memory unit by a display controller.

In accordance with the present invention, the above and other objects can be accomplished by the provision of a memory address and display control apparatus for an HDTV comprising memory address control means for controlling memory read/write addresses in response to a motion vector and a control signal, said memory address control means having display read control means for generating a display read address; motion compensation read control means for generating a motion compensation read address and raster format write control means for generating a raster format write address; memory means having a previous frame memory for storing a video signal of a previous frame and a present frame memory for storing a video signal of a present frame; multiplexing means for 2 to 1-multiplexing the output addresses from said memory address control means to alternately address said previous frame memory and said present frame memory in said memory means; input/output control means for controlling data input/output of said memory means in response to frame and invert frame signals; display control means for receiving video data from said memory means under the control of said input/output control means and displaying the received video data; and motion compensation means for receiving previous frame video data from said memory means under the control of said input/output control means and adding a DCT coefficient to the received previous frame video data to transform the received previous frame video data into present frame video data.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE INVENTION

Figure 1:
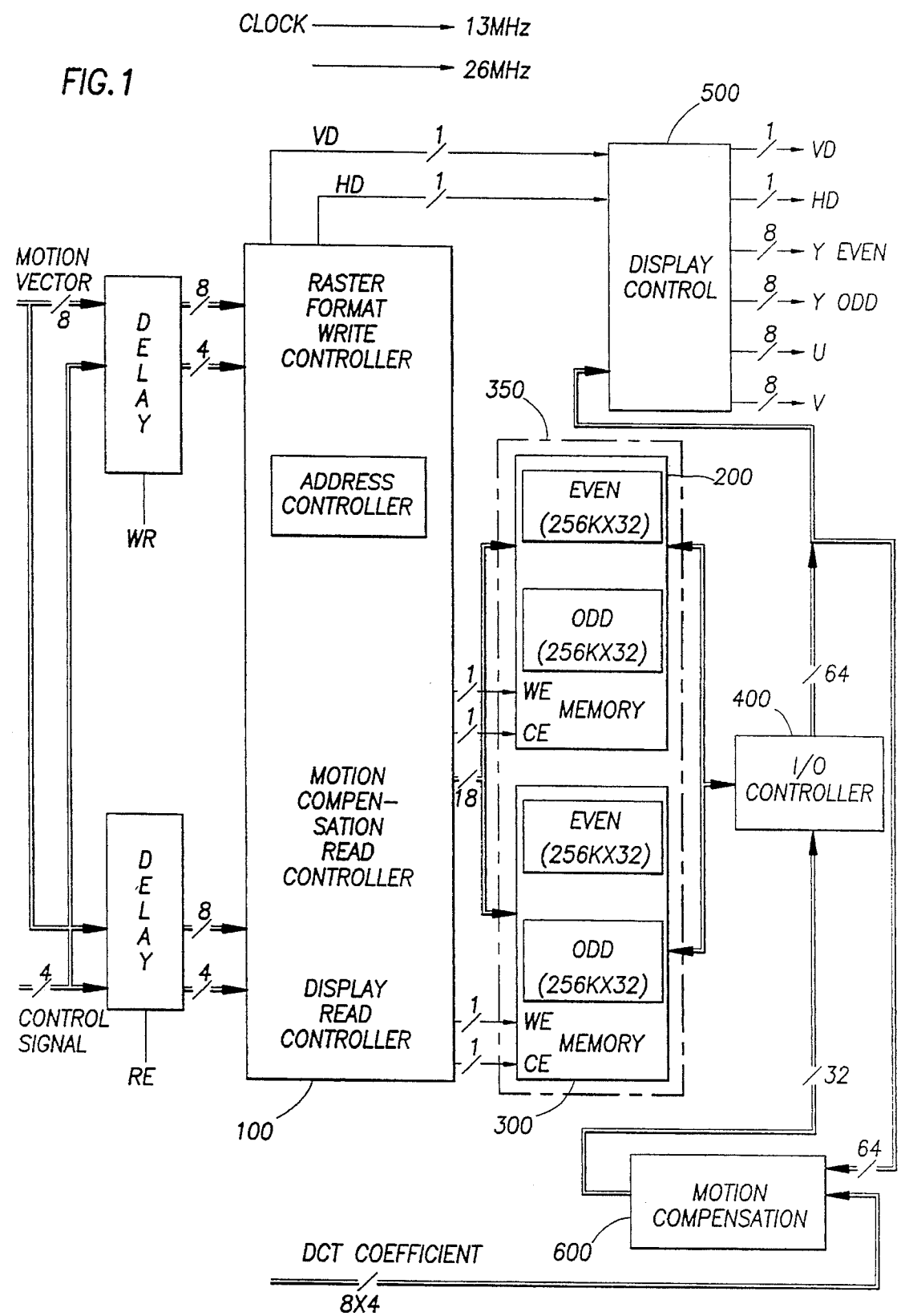
FIG. 1 is a block diagram of a memory address and display control apparatus for an HDTV in accordance with the present invention.

Referring to FIG. 1, there is shown a block diagram of a memory address and display control apparatus for an HDTV in accordance with the present invention. As shown in this drawing, the memory address and display control apparatus comprises a memory address controller 100 for controlling memory read/write addresses in response to a motion vector and a control signal. The memory address controller 100 has a display read control circuit for generating a display read address, a motion compensation read control circuit for generating a motion compensation read address and a raster format write control circuit for generating a raster format write address.

A memory unit 350 has a previous frame memory 200 for storing a video signal of a previous frame and a present frame memory 300 for storing a video signal of a present frame.

A multiplexing circuit (see FIG. 4) is provided in the memory address and display control apparatus to 2 to 1-multiplex the output addresses from the memory address controller 100 to alternately address the previous frame memory 200 and the present frame memory 300 in the memory unit 350.

Also, the memory address and display control apparatus comprises an input/output (I/O) controller 400 for controlling data input/output of the memory unit 350 in response to frame and invert frame signals, a display controller 500 for receiving video data from the memory unit 350 under the control of the I/O controller 400 and displaying the received video data, and a motion compensation circuit 600 for receiving previous frame video data from the memory unit 350 under the control of the I/O controller 400 and adding a DCT coefficient to the received previous frame video data into present frame video data.

Figures 2, 6, 7:
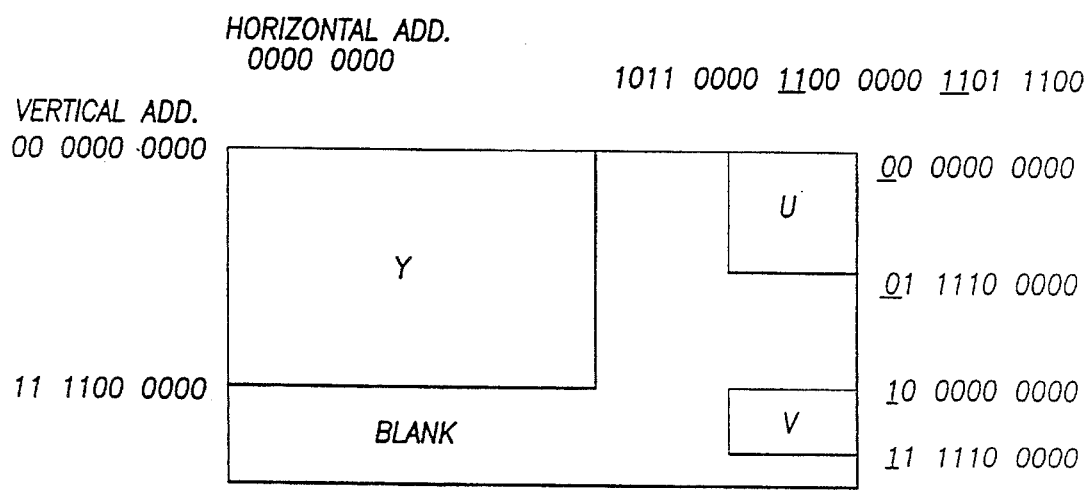
FIG. 2 is a view illustrating a memory configuration in accordance with the present invention.
FIG. 6 is a view illustrating a display format in accordance with the present invention.
FIG. 7 is a view illustrating a color difference signal display format in accordance with the present invention.

Referring to FIG. 2, there is shown a memory configuration in accordance with the present invention. In this drawing, there are shown locations in which luminance and color difference signals Y, U, and V are stored in each frame memory in the memory unit 350. In order to read Y, U, and V data from each frame memory in the memory unit 350, Y, U, and V addresses are classified according to most significant bits (MSBs) of vertical and horizontal addresses, as follows:

|   | HORIZONTAL ADDRESS | VERTICAL ADDRESS |
|---|---|---|
| Y | 00XXXXXX | XXXXXXXXXX |
| Y | 01XXXXXX | XXXXXXXXXX |
| Y | 10XXXXXX | XXXXXXXXXX |
| U | 11XXXXXX | 0XXXXXXXXX |
| V | 11XXXXXX | 1XXXXXXXXX |

The memory address controller 100 acts to control the memory unit 350 for the motion compensation and display of the video data from the memory unit 350. To this end, the memory address controller 100 uses 18 memory address buses, 10 vertical address buses, and 8 horizontal address buses to control the memory unit 350.

Figure 3:
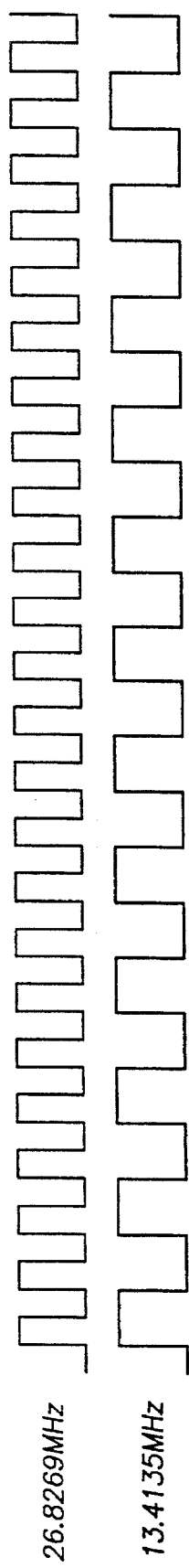
FIG. 3 is a memory address timing diagram in accordance with the present invention.

In the memory address controller 100, the raster format write control circuit is adapted to generate the raster format write address to transform a block scanning format of the video data into a display raster format. The motion compensation read control circuit is adapted to generate the motion compensation read address to read the previous frame video data from the memory unit 350. The display read control circuit is adapted to generate the display read address to read the Y, U, and V data from the memory unit 350 for the display, as will be described later in detail with reference to FIG. 9. FIG. 3 is a timing diagram of the motion compensation read address, display read address and raster format write address from the motion compensation read control circuit, the display read control circuit and the raster format write control circuit in the memory address controller 100.

The two read addresses and one write address from the memory address controller 100 are generated to alternately address the previous frame memory 200 and the present frame memory 300 in the memory unit 350 in the unit of frame.

Figure 4:
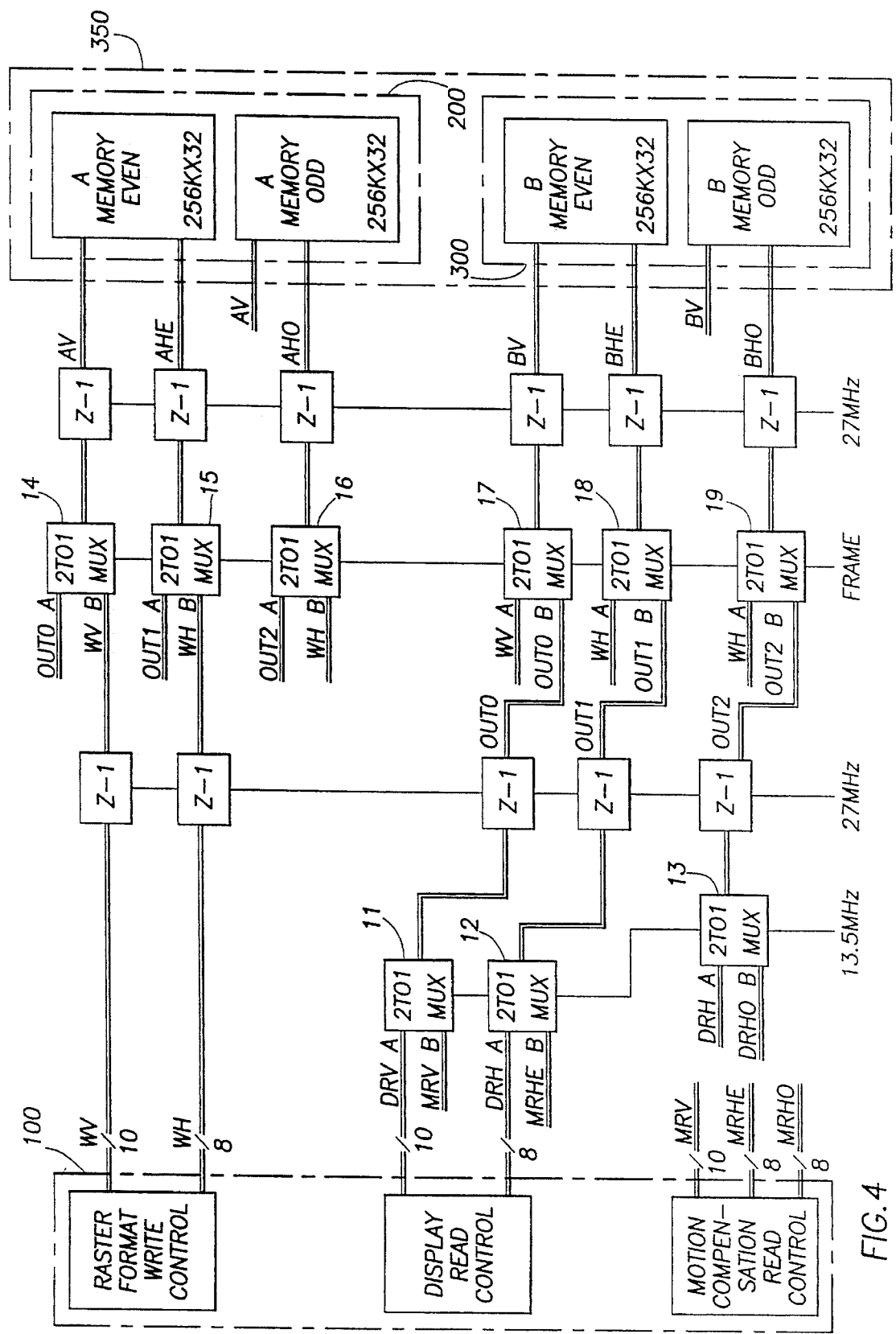
FIG. 4 is a block diagram of a multiplexing circuit in accordance with the present invention.

Referring to FIG. 4, there is shown a block diagram of the multiplexing circuit in accordance with the present invention. As shown in this drawing, the multiplexing circuit includes a first multiplexer 11 for 2 to 1-multiplexing vertical addresses DRV and MRV from the display read control circuit and the motion compensation read control circuit in the memory address controller 100, a second multiplexer 12 for 2 to 1-multiplexing a horizontal address DRH from the display read control circuit in the memory address controller 100 and an even memory horizontal address MRHE from the motion compensation read control circuit in the memory address controller 100, and a third multiplexer 13 for 2 to 1-multiplexing the horizontal address DRH from the display read control circuit in the memory address controller 100 and an odd memory horizontal address MRHO from the motion compensation read control circuit in the memory address controller 100.

A fourth multiplexer 14 is provided in the multiplexing circuit to 2 to 1-multiplex an output address OUT0 from the first multiplexer 11 and a vertical address WV from the raster format write control circuit in the memory address controller 100 and output the multiplexed address as a vertical address AV to the previous frame memory 200 in the memory unit 350.

A fifth multiplexer 15 is also provided in the multiplexing circuit to 2 to 1-multiplex an output address OUT1 from the second multiplexer 12 and a horizontal address WH from the raster format write control circuit in the memory address controller 100 and output the multiplexed address as an even memory horizontal address AHE to the previous frame memory 200 in the memory unit 350.

A sixth multiplexer 16 is also provided in the multiplexing circuit to 2 to 1-multiplex an output address OUT2 from the third multiplexer 13 and the horizontal address WH from the raster format write control circuit in the memory address controller 100 and output the multiplexed address as odd memory horizontal address AHO to the previous frame memory 200 in the memory unit 350.

A seventh multiplexer 17 is also provided in the multiplexing circuit to 2 to 1-multiplex the output address OUT0 from the first multiplexer 11 and the vertical address WV from the raster format write control circuit in the memory address controller 100 and output the multiplexed address as a vertical address BV to the present frame memory 300 in the memory unit 350.

An eighth multiplexer 18 is also provided in the multiplexing circuit to 2 to 1-multiplex the output address OUT1 from the second multiplexer 12 and the horizontal address WH from the raster format write control circuit in the memory address controller 100 and output the multiplexed address as an even memory horizontal address BHE to the present frame memory 300 in the memory unit 350.

A ninth multiplexer 19 is also provided in the multiplexing circuit to 2 to 1-multiplex the output address OUT2 from the third multiplexer 13 and the horizontal address WH from the raster format write control circuit in the memory address controller 100 and output the multiplexed address as an odd memory horizontal address BHO to the present frame memory 300 in the memory unit 350.

In this manner, the previous frame memory 200 and the present frame memory 300 in the memory unit 350 are alternately addressed in the unit of frame according to the read and write addresses from the memory address controller 100 by the multiplexing circuit.

Figure 5:
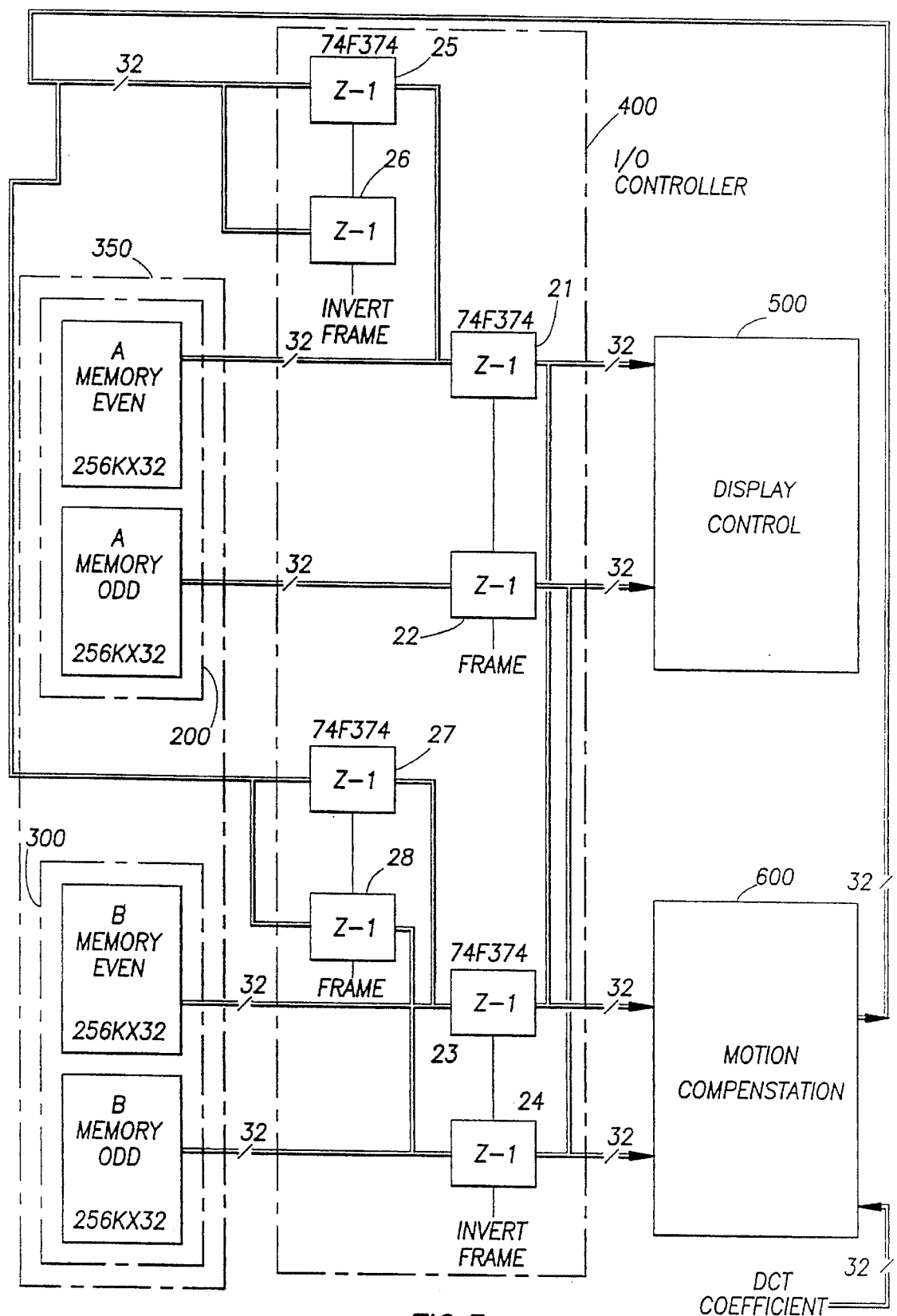
FIG. 5 is a block diagram of an input/output controller in accordance with the present invention.

Referring to FIG. 5, there is shown a block diagram of the I/O controller 400 in accordance with the present invention. As shown in this drawing, the I/O controller 400 includes a first flip-flop 21 for delaying even memory data from the previous frame memory 200 in the memory unit 350 in response to the frame signal and outputting the delayed even memory data to the display controller 500 and the motion compensation circuit 600.

A second flip-flop 22 is provided in the I/O controller 400 to delay odd memory data from the previous frame memory 200 in the memory unit 350 in response to the frame signal and output the delayed odd memory data to the display controller 500 and the motion compensation circuit 600.

A third flip-flop 23 is also provided in the I/O controller 400 to delay even memory data from the present frame memory 300 in the memory unit 350 in response to the invert frame signal and output the delayed even memory data to the display controller 500 and the motion compensation circuit 600.

A fourth flip-flop 24 is also provided in the I/O controller 400 to delay odd memory data from the present frame memory 300 in the memory unit 350 in response to the invert frame signal and output the delayed odd memory data to the display controller 500 and the motion compensation circuit 600.

Also, the I/O controller 400 includes a fifth flip-flop 25 for delaying the motion compensated frame data in response to the invert frame signal and applying the delayed motion compensated frame data in parallel to an input data bus of the first flip-flop 21, a sixth flip-flop 26 for delaying the motion compensated frame data in response to the invert frame signal and applying the delayed motion compensated frame data in parallel to an input data bus of the second flip-flop 22, a seventh flip-flop 27 for delaying the motion compensated frame data in response to the frame signal and applying the delayed motion compensated frame data in parallel to an input data bus of the third flip-flop 23, and an eighth flip-flop 28 for delaying the motion compensated frame data in response to the frame signal and applying the delayed motion compensated frame data in parallel to an input data bus of the fourth flip-flop 24.

Figure 9:
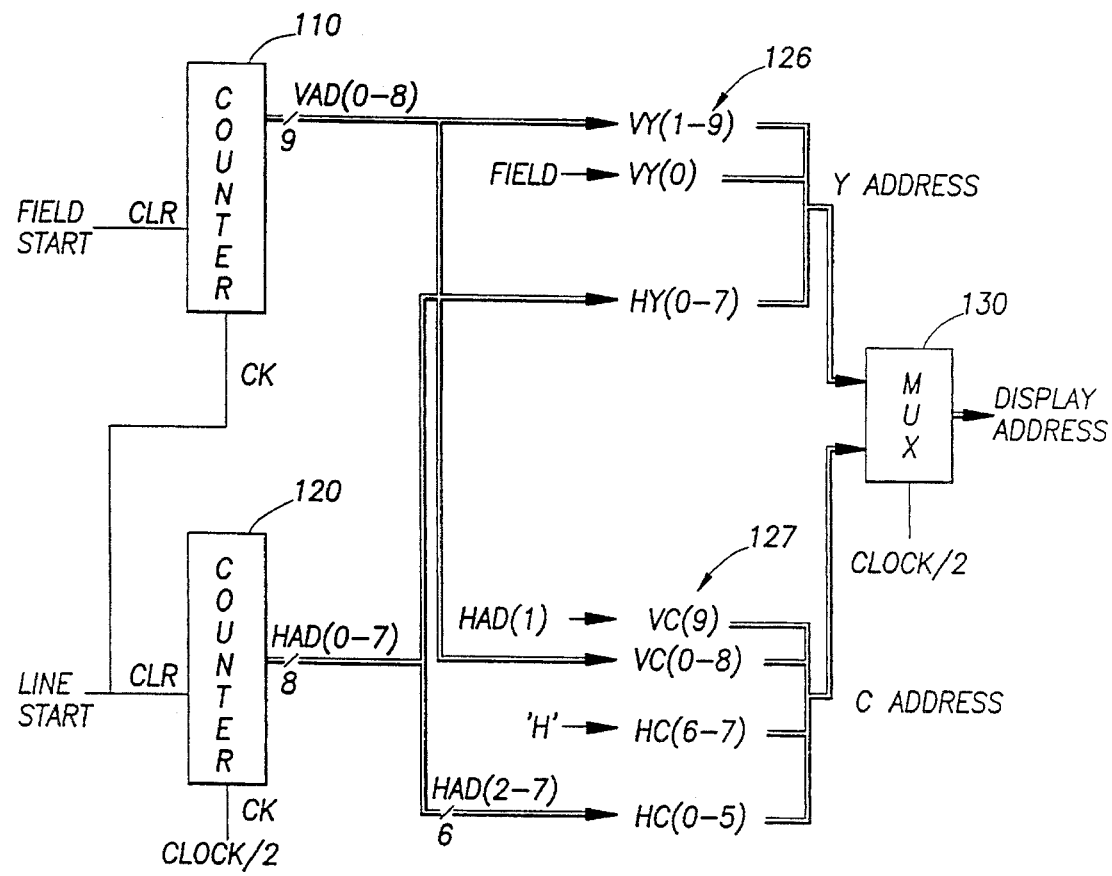
FIG. 9 is a block diagram of a display read control circuit in accordance with the present invention.

Referring to FIG. 9, there is shown a block diagram of the display read control circuit of the memory address controller 100 in accordance with the present invention. The display read control circuit is adapted to read the video data stored in the unit of block in each frame memory in the memory unit 350 in a raster scanning manner and display the read video data on a screen.

As shown in FIG. 9, the display read control circuit includes a vertical address counter 110 for incrementing an address value by one every line to generate a 9-bit address. The vertical address counter 110 is cleared at a field start point in response to a field start signal to count one field.

A horizontal address counter 120 is provided in the display read control circuit to increment an address value by one every two clocks period to generate an 8-bit address. The horizontal address counter 120 is cleared at a line start point in response to a line start signal to count one line.

A luminance signal address generator 126 is also provided in the display read control circuit to generate a luminance signal (Y) address in response to the 9-bit and 8-bit addresses from the vertical and horizontal address counters 110 and 120 and a field signal. A vertical address of the luminance signal (Y) address has 9 most significant bits (MSBs) and a least significant bit (LSB). The 9 most significant bits VY(1–9) of the vertical address of the luminance signal (Y) address are 9 bits VAD (0–8) of the address from the vertical address counter 110 and the least significant bit VY(0) thereof is the field signal. The field signal is logically 0 in the first field and logically 1 in the second field. A horizontal address HY(0–7) of the luminance signal (Y) address is the 8-bit address HAD(0–7) from the horizontal address counter 120.

A color signal address generator 127 is also provided in the display read control circuit to generate a color signal (C) address in response to the 9-bit and 8-bit addresses from the vertical and horizontal address counters 110 and 120. A vertical address of the color signal (C) address has a most significant bit (MSB) and 9 least significant bits (LSBs). The most significant bit VC(9) of the vertical address of the color signal (C) address is a second bit HAD(1) of the 8-bit address from the horizontal address counter 120 and the 9 last significant bits VC(0–8) thereof are the 9 bits VAD(0–8) of the address from the vertical address counter 110. A horizontal address of the color signal (C) address has 2 most significant bits (MSBs) and 6 least significant bits (LSBs). The 2 most significant bits HC(6–7) of the horizontal address of the color signal (C) address are fixed to a high level and the 6 least significant bits HC(0–5) thereof are 6 most significant bits HAD(2–7) of the 8-bit address from the horizontal address counter 120.

A multiplexer 130 is also provided in the display read control circuit to alternately select the luminance signal (Y) address from the luminance signal address generator 126 and the color signal (C) address from the color signal address generator 127 every clock.

Figure 10:
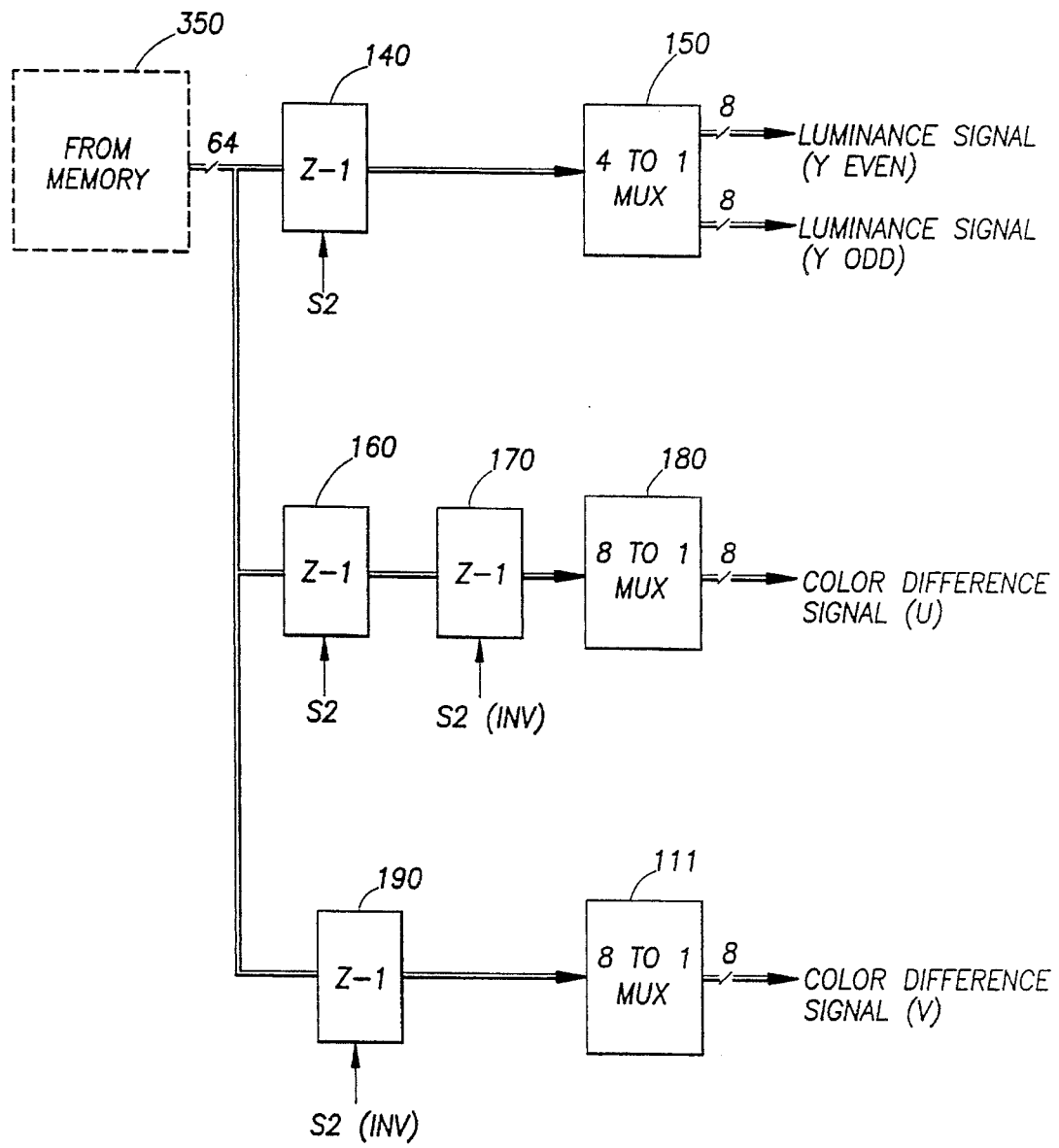
FIG. 10 is a block diagram of a display controller in accordance with the present invention.
Figure 11:
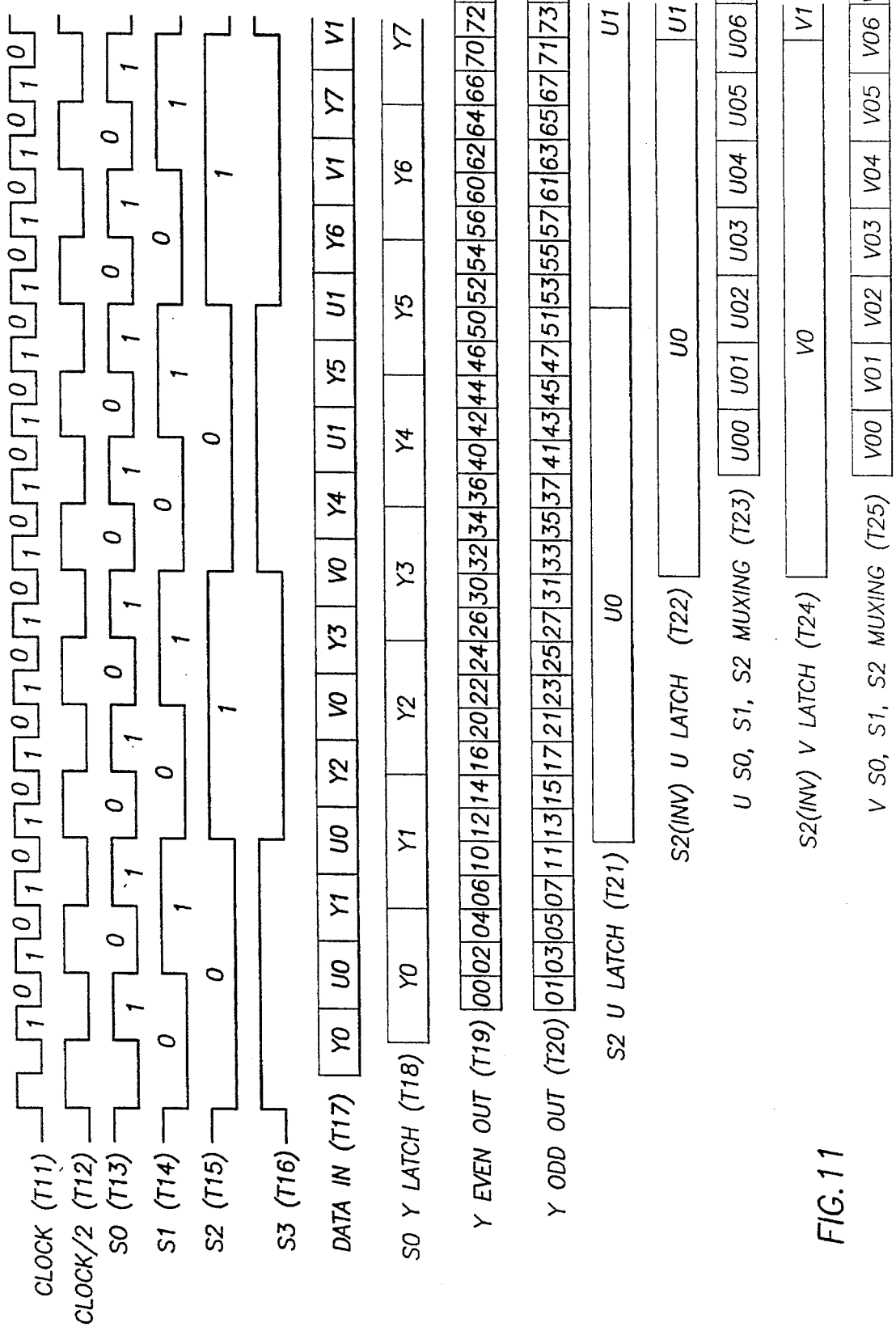
FIG. 11 is a display control timing diagram in accordance with the present invention.

FIG. 10 is a block diagram of the display controller 500 in accordance with the present invention, and FIG. 11 is a display control timing diagram in accordance with the present invention. The display controller 500 is adapted to convert serial luminance and first and second color difference data Y, U, and V from each frame memory in the memory unit 350 into parallel data suitable to a display format.

As shown in FIGS. 10 and 11, the display controller 500 includes a first flip-flop 140 for latching the luminance and first and second color difference data Y, U, and V T17 from each frame memory in the memory unit 350 in response to a first clock signal T13 and separating the luminance data Y therefrom to generate a first timing signal T18, a 4 to 1 multiplexer 150 for separating even and odd luminance signals T19 and T20 from the first timing signal T18 from the first flip-flop 140, and a second flip-flop 160 for latching the luminance and first and second color difference data Y, U, and V T17 from each frame memory in the memory unit 350 in response to a second clock signal T15 and separating the first color difference data U therefrom to generate a second timing signal T21.

A first 8 to 1 multiplexer 180 is provided in the display controller 500 to separate a first color difference signal U T23 from a third timing signal T22.

A third flip-flop 170 is also provided in the display controller 500 to latch the second timing signal T21 from the second flip-flop 160 in response to an inverted one T16 of the second clock signal T15 to match an output timing of the even and odd luminance signals T19 and T20 from the 4 to 1 multiplexer 150 with that of the first color difference signal U T23 from the first 8 to 1 multiplexer 180 and output the resultant third timing signal T22 to the first 8 to 1 multiplexer 180.

A fourth flip-flop 190 is also provided in the display controller 500 to latch the luminance and first and second color difference data Y, U, and V T17 from each frame memory in the memory unit 350 in response to the inverted one T16 of the second clock signal T15 and separate the second color difference data V therefrom to generate a fourth timing signal T24.

A second 8 to 1 multiplexer 111 is provided in the display controller 500 to separate a second color difference signal V T25 from the fourth timing signal T24 from the fourth flip-flop 190.

The operation of the memory address and display control apparatus with the above-mentioned construction in accordance with the present invention will hereinafter be described in detail.

First, in the multiplexing circuit, the vertical addresses DRV and MRV from the display read control circuit and the motion compensation read control circuit in the memory address controller 100 are 2 to 1-multiplexed by the first multiplexer 11 was shown in FIG. 4. The second multiplexer 12 2 to 1-multiplexes the horizontal address DRH from the display read control circuit and the even memory horizontal address MRHE from the motion compensation read control circuit. The horizontal address DRH from the display read control circuit is also applied to the third multiplexer 13.

The horizontal address DRH from the display read control circuit and the odd memory horizontal address MRHO from the motion compensation read control circuit are 2 to 1-multiplexed by the third multiplexer 13. The output address OUT0 from the first multiplexer 11 and the vertical address WV from the raster format write control circuit in the memory address controller 100 are 2 to 1-multiplexed by the fourth multiplexer 14. As a result of the multiplexing, the fourth multiplexer 14 applies the vertical address AV to the previous frame memory 200 in the memory unit 350.

The output address OUT1 from the second multiplexer 12 and the horizontal address WH from the raster format write control circuit are 2 to 1-multiplexed by the fifth multiplexer 15. As a result of the multiplexing, the fifth multiplexer 15 applies even memory horizontal address AHE to the previous frame memory 200 in the memory unit 350.

On the other hand, the sixth multiplexer 16 2 to 1-multiplexes the output address OUT2 from the third multiplexer 13 and the horizontal address WH from the raster format write control circuit and outputs the multiplexed address as the odd memory horizontal address AHO to the previous frame memory 200 in the memory unit 350. The seventh multiplexer 17 2 to 1-multiplexes the output address OUT0 from the first multiplexer 11 and the vertical address WV from the raster format write control and circuit and outputs the multiplexer address as the vertical address BV to the present frame memory 300 in the memory unit 350.

Also, the eighth multiplexer 18 2 to 1-multiplexes the output address OUT1 from the second multiplexer 12 and the horizontal address WH from the raster format write control circuit and outputs the multiplexed address as the even memory horizontal address BHE to the present frame memory 300 in the memory unit 350.

The ninth multiplexer 19 2 to 1-multiplexes the output address OUT2 from the third multiplexer 13 and the horizontal address WH from the raster format write control circuit and outputs the multiplexer address as the odd memory horizontal address BHO to the present frame memory 300 in the memory unit 350.

Here, the vertical and horizontal addresses WV and WH from the raster format write control circuit and the output addresses OUT0–OUT2 from the first to third multiplexers 11–13 are delayed by delays 20 and then applied to the fourth to ninth multiplexers 14–19, respectively. Also, the output addresses from the fourth to ninth multiplexers 14–19 are delayed by the delays 20 and then applied to the memory unit 350, respectively.

Noticeably, the fourth to ninth multiplexers 14–19 are selectively controlled in the unit of frame.

The data input/output of the memory unit 350 based on the address multiplexing as mentioned above are controlled by the I/O controller 400 as shown in FIG. 5.

The I/O controller 400 acts to transfer the motion compensation and display video data, outputted from the memory unit 350 under the control of the motion compensation read control circuit and the display read control circuit in the memory address controller 100, and the motion compensated video data to be stored in the memory unit 350 under the control of the raster format write control circuit in the memory address controller 100 to the motion compensation circuit 600, the display controller 500, and the memory unit 350, respectively.

Because each of the two frame memories in the memory unit 350 is read/written in the unit of frame, a data path is controlled in the unit of frame in the I/O controller 400.

In detail, in the I/O controller 400, the motion compensated frame data is delayed by the fifth and sixth flip-flops 25 and 26 in response to the invert frame signal. The motion compensated frame data is also delayed by the seventh and eighth flip-flops 27 and 28 in response to the frame signal. The motion compensated frame data delayed by the fifth to eighth flip-flops 25–28 are applied in parallel to the input data buses of the first to fourth flip-flops 21–24, respectively. The even memory data from the previous fame memory 200 in the memory unit 350 is delayed by the first flip-flop 21 in response to the frame signal and then applied to the display controller 500 and the motion compensation circuit 600. The second flip-flop 22 delays the odd memory data from the previous frame memory 200 in the memory unit 350 in response to the frame signal and outputs the delayed odd memory data to the display controller 500 and the motion compensation circuit 600. Also, the even memory data from the present frame memory 300 in the memory unit 350 is delayed by the third flip-flop 23 in response to the invert frame signal and then applied to the display controller 500 and the motion compensation circuit 600. The odd memory data from the present frame memory 300 in the memory unit 350 is delayed by the fourth flip-flop 24 in response to the invert frame signal and then applied to the display controller 500 and the motion compensation circuit 600. Here, the frame and invert frame signals are applied to output enable terminals of the corresponding flip-flops for the control of data input flow.

Namely, for example, if the frame signal is logically 1, data is written into a memory A (for example, the previous frame memory 200), and data is read from a memory B (for example, the present frame memory 300) and then applied to the display controller 500 and the motion compensation circuit 600.

Figure 8:
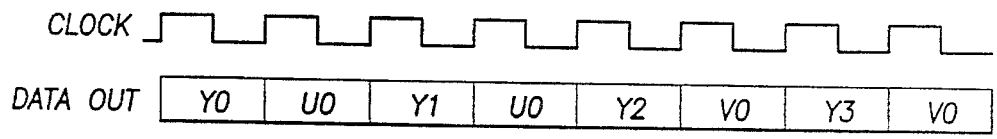
FIG. 8 is a display read timing diagram in accordance with the present invention.

FIG. 6 is a view illustrating a display format in accordance with the present invention, FIG. 7 is a view illustrating a color difference signal display format in accordance with the present invention, and FIG. 8 is a display read timing diagram in accordance with the present invention. In the preferred embodiment of the present invention, the display format is of an interlaced scanning type of horizontal 1704 pixels and vertical 1050 lines as shown in FIG. 6. Here, a horizontal blank width is of 296 pixels, and a vertical blank width is of 45 lines.

In the frame memory of FIG. 2, the luminance data Y is stored in the unit of frame. In this case, read from the frame memory are an even line in the case of an even field and an odd line in the case of an odd field, for the display format as shown in FIG. 6. On the other hand, the color difference data U and V are decimated at a ratio of 8:1:1 and then stored in the frame memory of FIG. 2. In this case, the same data is read from the frame memory in the even and odd fields differently from the case of the luminance data Y. For this reason, one pixel of the color difference data U and V is read whenever 4 pixels of the luminance data Y are read, as shown in FIG. 7.

In order to display the video data in the display format as shown in FIG. 6, the luminance data Y and the color difference data U and V are simultaneously required. However, the simultaneous read of the luminance data Y and the color difference data U and V is impossible in that they are stored in the same memory. For this reason, the luminance data Y and the color difference data U and V are sequentially read from the same memory, as shown in FIG. 8, and then separated by the display controller. Because one pixel of the color difference data U and V is read whenever 4 pixels of the luminance data Y are read, the color difference data U0 and V0 are read when the luminance data Y0, Y1, Y2, and Y3 are read, as shown in FIG. 8.

The display read control circuit in FIG. 9 is used to read the video data from the frame memory in FIG. 2 in the form as shown in FIG. 8. In the display read control circuit, the vertical address counter 110 increments its address value by one every line to generate the 9-bit address. The vertical address counter 110 is cleared at the field start point in response to the field start signal to count one field. The horizontal address counter 120 increments its address value by one every two clocks period to generate the 8-bit address. The horizontal address counter 120 is cleared at the line start point in response to the line start signal to count one line. The 9 bits VAD(0–8) of the address from the vertical address counter 110 are used as the 9 most significant bits VY(1–9) of the vertical address of the luminance signal (Y) address, and the field signal is used as the least significant bit VY(0) thereof. The field signal is logically 0 in the first field and logically 1 in the second field. With the field signal used, the even line is read from the frame memory in the first field and the odd line is read from the frame memory in the second field. The 8-bit address HAD(0–7) from the horizontal address counter 120 is used directly as the horizontal address HY(0–7) of the luminance signal (Y) address.

On the other hand, in the color signal (C) address, the most significant bit of the vertical address and the 2 most significant bits are used for positional distinction between the color difference data U and V and the luminance data Y in the frame memory of FIG. 2. The second bit HAD(1) of the 8-bit address from the horizontal address counter 120 is used as the most significant bit VC(9) of the vertical address of the color signal (C) address, and the 9 bits VAD(0–8) of the address from the vertical address counter 110 are used as the 9 least significant bits VC(0–8) thereof. As a result, the color difference data U and V can repeatedly be read at a period of 4 clocks, as shown in FIG. 8.

The multiplexer 130 alternately selects the luminance signal (Y) address from the luminance signal address generator 126 and the color signal (C) address from the color signal address generator 127 every clock. As a result, the luminance data Y and the color difference data U and V can be addressed repeatedly, as shown in FIG. 8.

The display controller 500 is adapted to convert the serial luminance and first and second color difference data Y, U, and V from each frame memory in the memory unit 350 into the parallel data suitable to the display format. As shown in FIG. 10 and 11, in the display controller 500, the first flip-flop 140 latches the luminance and first and second color difference data Y, U, and V T17 from each frame memory in the memory unit 350 in response to the first clock signal T13 and separates the luminance data Y therefrom. As a result, the first timing signal T18 is generated from the first flip-flop 140. In each of intervals Y0, Y1, Y2, . . . of the first timing signal T18, 4 pixels are present in each of the odd and even fields. For this reason, the 4 to 1 multiplexer 150 acts to separate the even and odd luminance signals T19 and T20 from the first timing signal T18 from the first flip-flop 140.

Also, the second flip-flop 160 latches the luminance and first and second color difference data Y, U, and V T17 from each frame memory in the memory unit 350 in response to the second clock signal T15 and separates the first color difference data U therefrom to generate the second timing signal T21. In order to match the output timing of the even and odd luminance signals T19 and T20 from the 4 to 1 multiplexer 150 with that of the first color difference signal U T23 from the first 8 to 1 multiplexer 180, the third flip-flop 170 acts to latch the second timing signal T21 from the second flip-flop 160 in response to the inverted one T16 of the second clock signal T15. As a result, the third timing signal T22 is generated from the third flip-flop 170. In each of intervals U0, U1, U2, . . . of the third timing signal T22, there are present 8 pixels U00–U07, U10–U17, . . . For this reason, the first 8 to 1 multiplexer 180 acts to separate the first color difference signal U T23 from the third timing signal T22 from the third flip-flop 170.

The fourth flip-flop 190 latches the luminance and first and second color difference data Y, U, and V T17 from each frame memory in the memory unit 350 in response to the inverted one T16 of the second clock signal T15 and separates the second color difference data V therefrom to generate the fourth timing signal T24. In each of intervals V0, V1, V2, . . . of the third timing signal T24, there are present 8 pixels V00–V07, V10–V17, . . . For this reason, the second 8 to 1 multiplexer 111 acts to separate the second color difference signal V T25 from the fourth timing signal T24 from the fourth flip-flop 190.

As a result, the display controller 500 in FIG. 10 separates the luminance and first and second color difference data Y, U, and V from the video data input T17 from the memory unit 350. Then, the display controller 500 processes the separated luminance data Y in a parallel two-stage manner and, thus, outputs the even and odd luminance signals. Also, the display controller 500 processes the separated first and second color difference data and, thus, outputs the color difference signals U and V.

As apparent from the above description, according to the present invention, the data input/output of the memory unit can be efficiently controlled on the basis of an interfacing architecture of the memory unit, the memory address controller, the motion compensation circuit, and the display controller for the purpose of the motion compensation of the HDTV. Also, the present invention may be applied to all video processing systems, such as the HDTV, an MPEG, a JPEG, a video phone, and the like, employing a digital video compression manner in which a block transform is performed by DCT, VQ, etc.

Although the preferred embodiments of the present invention have been disclosed for illustrative purposes, those skilled in the art will appreciate that various modifications, additions, and substitutions are possible without departing from the scope and spirit of the invention as disclosed in the accompanying claims.

What is claimed is:

1. A memory address and display control apparatus for an HDTV comprising:

memory address control means for controlling memory read/write addresses in response to a motion vector and a control signal, said memory address control means having display read control means for generating a display read address, motion compensation read control means for generating a motion compensation read address, and raster format write control means for generating a raster format write address;

memory means having a previous frame memory for storing a video signal of a previous frame and a present frame memory for storing a video signal of a present frame;

multiplexing means for 2 to 1-multiplexing the output addresses from said memory address control means to alternately address said previous frame memory and said present frame memory in said memory means;

input/output control means for controlling data input/output of said memory means response to frame and invert frame signals;

display control means for receiving video data from said memory means and displaying the received video data;

motion compensation means for receiving previous frame video data from said memory means and adding a DCT coefficient to the received previous frame video data to transform the received previous frame video data into present frame video data.

2. A memory address and display control apparatus for an HDTV as set forth in claim 1, wherein said multiplexing means includes:

a first multiplexer for 2 to 1-multiplexing vertical addresses from said display read control means and said motion compensation read control means in said memory address control means;

a second multiplexer to 2to 1-multiplexing a horizontal address from said display read control means in said memory address control means and an even memory horizontal address from said motion compensation read control means in said memory address control means;

a third multiplexer for 2 to 1-multiplexing the horizontal address from said display read control means in said memory address control means and an odd memory horizontal address from said motion compensation read control means in said memory address control means;

a fourth multiplexer for 2 to 1-multiplexing an output address from said first multiplexer and a vertical address from said raster format write control means in said memory address control means and outputting the multiplexed address as a vertical address to said previous frame memory in said memory means;

a fifth multiplexer for 2 to 1-multiplexing an output address from said second multiplexer and a horizontal address from said raster format write control means in said memory address control means and outputting the multiplexer address as an even memory horizontal address to said previous frame memory in said memory means;

a sixth multiplexer for 2 to 1-multiplexing an output address from said third multiplexer and the horizontal address from said raster format write control means in said memory address control means and outputting the multiplexed address as an odd memory horizontal address to said previous frame memory in said memory means;

a seventh multiplexer for 2 to 1-multiplexing the output address from said first multiplexer and the vertical address from said raster format write control means in said memory address control means and outputting the multiplexed address as a vertical address to said present frame memory in said memory means;

an eighth multiplexer for 2 to 1-multiplexing the output address from said second multiplexer and the horizontal address from said raster format write control means in said memory address control means and outputting the multiplexed address as an even memory horizontal address to said present frame memory in said memory means; and a ninth multiplexer for 2 to 1-multiplexing the output address from said third multiplexer and the horizontal address from said raster format write control means in said memory address control means and outputting the multiplexed address as an odd memory horizontal address to said present frame memory in said memory means;

whereby said previous frame memory and said present frame memory in said memory means are alternately addressed in the unit of frame according to the read and write addresses from said memory address control means.

3. A memory address and display control apparatus for an HDTV as set forth in claim 1, wherein said input/output control means includes:

a first flip-flop for delaying even memory data from said previous frame memory in said memory means in response to the frame signal and outputting the delayed even memory data to said display control means and said motion compensation means;

a second flip-flop for delaying odd memory data from said previous frame memory in said memory means in response to the frame signal and outputting the delayed odd memory data to said display control means and said motion compensation means;

a third flip-flop for delaying even memory data from said present frame memory in said memory means in response to the invert frame signal and outputting the delayed even memory data to said display control means and said motion compensation means;

a fourth flip-flop for delaying odd memory data from said present frame memory in said memory means in response to the invert frame signal and outputting the delayed odd memory data to said display control means and said motion compensation means;

a fifth flip-flop for delaying the DCT coefficient in response to the invert frame signal and applying the delayed DCT coefficient in parallel to an input data bus of said first flip-flop;

a sixth flip-flop for delaying the DCT coefficient in response to the invert frame signal and applying the delayed DCT coefficient in parallel to an input data bus of said second flip-flop;

a seventh flip-flop for delaying the DCT coefficient in response to the frame signal and applying the delayed DCT coefficient in parallel to an input data bus of said third flip-flop; and an eighth flip-flop for delaying the DCT coefficient in response to the frame signal and applying the delayed DCT coefficient in parallel to an input data bus of said fourth flip-flop.

4. A memory address and display control apparatus for an HDTV as set forth in claim 1, wherein said display read control means of said memory address control means includes:

a vertical address counter for incrementing an address value by one every line to generate a 9-bit address, said vertical address counter being cleared at a field start point in response to a field start signal to count one field;

a horizontal address counter for incrementing an address value by one every two clocks period to generate an 8-bit address, said horizontal address counter being cleared at a line start point in response to a line start signal to count one line;

a luminance signal address generator for generating a luminance signal address in response to the 9-bit and 8-bit addresses from said vertical and horizontal address counters and a field signal, a vertical address of said luminance signal address having 9 most significant bits and a least significant bit, said 9 most significant bits of the vertical address of the luminance signal address being 9 bits of the address from said vertical address counter, said least significant bit of the vertical address of the luminance signal address being the field signal, said field signal being logically 0 in the first field and logically 1 in the second field, a horizontal address of said luminance signal address being the 8-bit address from said horizontal address counter;

a color signal address generator for generating a color signal address in response to the 9-bit and 8-bit addresses from said vertical and horizontal address counters, a vertical address of said color signal address having a most significant bit and 9 least significant bits, said most significant bit of the vertical address of the color signal address being a second bit of the 8-bit address from said horizontal address counter, said 9 least significant bits of the vertical address of the color signal address being the 9 bits of the address from said vertical address counter, a horizontal address of said color signal address having 2 most significant bits and 6 least significant bits, said 2 most significant bits of the horizontal address of the color signal address being fixed to a high level, said 6 least significant bits of the horizontal address of the color signal address being 6 most significant bits of the 8-bit address from said horizontal address counter; and a multiplexer for alternately selecting the luminance signal address from said luminance signal address generator and the color signal address from said color signal address generator every clock;

whereby video data stored in the unit of block in said memory means is read in a raster scanning manner and then displayed on a screen.

5. A memory address and display control apparatus for an HDTV as set forth in claim 1, wherein said display control means includes:

a first flip-flop for latching luminance and first and second color difference data from said memory means in response to a first clock signal and separating the luminance data therefrom to generate a first timing signal;

a 4 to 1 multiplexer for separating even and odd luminance signals from said first timing signal from said first flip-flop;

a second flip-flop for latching the luminance and first and second color difference data from said memory means in response to a second clock signal and separating the first color difference data therefrom to generate a second timing signal;

a first 8 to 1 multiplexer for separating a first color difference signal from a third timing signal;

a third flip-flop for latching the second timing signal from said second flip-flop in response to an inverted one of the second clock signal to match an output timing of the even and odd luminance signals from said 4 to 1 multiplexer with that of the first color difference signal from said first 8 to 1 multiplexer and outputting the resultant third timing signal to said first 8 to 1 multiplexer;

a fourth flip-flop for latching the luminance and first and second color difference data from said memory means in response to the inverted one of the second clock signal and separating the second color difference data therefrom to generate a fourth timing signal; and a second 8 to 1 multiplexer for separating a second color difference signal from the fourth timing signal from said fourth flip-flop.

* * * * *

UNITED STATES PATENT AND TRADEMARK OFFICE
CERTIFICATE OF CORRECTION

PATENT NO.  : 5,469,228
DATED       : November 21, 1995
INVENTOR(S) : Beom S. Kim, Jin H. Lee, and Kyoung B. Koo It is certified that error appears in the above-indentified patent and that said Letters Patent is hereby corrected as shown below:

In column 7, line 31, delete "was" and insert therefor --as--.

In column 11, line 38, after "means" insert --in--.

In column 11, line 41, after the semicolon insert --and--.

In column 11, line 54, delete "to 2to" and insert therefor --for 2 to--.

Signed and Sealed this

Nineteenth Day of March, 1996

Attest:

BRUCE LEHMAN

Attesting Officer        Commissioner of Patents and Trademarks